United States Patent
Naber (10) Patent No.: US 10,337,631 B1
(45) Date of Patent: Jul. 2, 2019

(54) SYSTEM AND METHOD FOR AUTOMATIC SHUTOFF OF A HYDRAULIC FLUID FLOW IN THE EVENT OF A LOSS IN PRESSURE

(71) Applicant: Altec Industries, Inc., Birmingham, AL (US)

(72) Inventor: William Naber, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/163,166

(22) Filed: Oct. 17, 2018

(51) Int. Cl.
*F16K 17/24* (2006.01)

(52) U.S. Cl.
CPC .................................. *F16K 17/24* (2013.01)

(58) Field of Classification Search
CPC ........ F16K 17/24; F16K 17/28; F15B 20/005; F15B 2013/041; F15B 21/001; F15B 2211/30505; B25F 5/005
See application file for complete search history.

(56) References Cited

U.S. PATENT DOCUMENTS

| 3,568,705 | A | * | 3/1971 | Boyadjieff | F15B 20/005 137/460 |
|---|---|---|---|---|---|
| 3,587,393 | A | * | 6/1971 | Vick | F15B 20/005 137/102 |
| 4,004,607 | A | * | 1/1977 | Freese | F16K 17/20 137/460 |
| 4,269,241 | A | * | 5/1981 | Hickman | A01G 3/08 144/24.13 |
| 4,602,462 | A | * | 7/1986 | Anderson | B66F 11/044 182/2.9 |
| 4,732,190 | A | * | 3/1988 | Polselli | F16K 17/24 137/460 |
| 4,775,029 | A | * | 10/1988 | MacDonald | B66F 11/046 182/2.1 |
| 4,972,761 | A | * | 11/1990 | Thomsen | F15B 13/01 91/420 |
| 5,249,643 | A | * | 10/1993 | Backer | B66F 11/046 182/2.11 |
| 5,289,843 | A | * | 3/1994 | Smith | F15B 20/005 137/115.15 |
| 5,365,965 | A | * | 11/1994 | Dunn | F15B 20/005 137/115.13 |
| 5,819,534 | A | * | 10/1998 | Fischer | B66F 11/044 60/424 |
| 7,367,256 | B2 | * | 5/2008 | Fatemi | E02F 3/365 91/1 |
| 7,954,315 | B2 | * | 6/2011 | Yamashita | E02F 9/2239 60/421 |
| 8,800,426 | B2 | * | 8/2014 | Andersson | E02F 9/2203 91/420 |
| 9,822,805 | B2 | * | 11/2017 | De Gier | F15B 15/149 |

(Continued)

*Primary Examiner* — Thomas E Lazo
(74) *Attorney, Agent, or Firm* — Erise IP, P.A.

(57) ABSTRACT

Embodiments of the invention provide for a system and method for operating a hydraulic tool near high-voltage components. The hydraulic tool may be connected to couplers and receiving hydraulic fluid from a pump and returning the hydraulic fluid to a tank in an open center system or returning the hydraulic fluid to a tank in a closed center system. In the event of a loss in pressure the valves in the system change state stopping the flow of hydraulic fluid to the hydraulic tool without the use of electrical components.

20 Claims, 8 Drawing Sheets

(56) References Cited

U.S. PATENT DOCUMENTS

| | | | |
|---|---|---|---|
| 2010/0154902 A1* | 6/2010 | Loper | F15B 13/023 137/517 |
| 2012/0029775 A1* | 2/2012 | Peters | B23K 9/1006 701/50 |
| 2014/0288776 A1* | 9/2014 | Anderson | B60G 17/016 701/37 |
| 2016/0146226 A1* | 5/2016 | Goedken | F15B 13/0401 60/431 |

* cited by examiner

SYSTEM AND METHOD FOR AUTOMATIC SHUTOFF OF A HYDRAULIC FLUID FLOW IN THE EVENT OF A LOSS IN PRESSURE

BACKGROUND

1. Field

Embodiments of the invention are broadly directed to shutting off fluid flow of a hydraulic fluid in a hydraulic system. More specifically, embodiments of the invention are related to utilizing a system of valves for automatic shutoff of a fluid flow to a hydraulic tool in a hydraulic system in the event of a loss in pressure in the system.

2. Related Art

Hydraulic power tools are commonly used in place of electric tools when working near high-voltage power sources. Power lines and electrical components that carry electricity to households, business, manufacturing plants, or any other facility that uses electricity need maintenance and replacement. This is typically done using aerial devices that include a boom and utility platform that lifts workers to the power lines and electrically charged components that need maintenance. The aerial devices are typically covered in material that is electrically insulting, or dielectric material, such that contact with the electrically charged components is at least partially insulated. Electrical power is also restricted from use at the top of the aerial device. This is to prevent the electricity grounding through the electric infrastructure of the aerial device.

Workers in a utility platform assembly atop a boom of the aerial device typically need to use powered tools. Hydraulically powered tools instead of electrically powered tools are typically used in this situation. In the event of a leak or malfunction of the hydraulic tools typical systems, not in proximity to high-voltage electricity, employ electric cutoff valves to stop the flow of hydraulic fluid and shut down the equipment. Again, the electrical valves could create an avenue for electric flow in the event of a contact between the aerial device and highly-charged electrical equipment. Further, in the event of a leak, hydraulic fluid could flow from the hydraulic system. The hydraulic fluid may be flammable and could come in contact with high-voltage electrical equipment resulting in a fire. What is needed is a system for automatic shutdown of the hydraulic tools and equipment without the use of electrical valves or components. Further, what is needed is a hydraulic system, or hydraulic circuit, that prevents the loss, or release, of hydraulic fluid from the hydraulic system in the event of a breach or damage to the system components.

SUMMARY

Embodiments of the invention solve these problems by providing a system for automatically shutting down a hydraulic system in the event of a leak, malfunction, or loss in fluid pressure. In particular, in a first embodiment, the invention includes a system for providing a flow of a hydraulic fluid having a fluid pressure to a hydraulic tool, the system configured to prevent excessive loss of the hydraulic fluid when the fluid pressure decreases in the system, the system comprising a pump providing the flow of the hydraulic fluid, a first valve directing the flow through a source coupler to the hydraulic tool when the fluid pressure is above a first pressure threshold, a second valve receiving the flow from a return coupler and directing the flow to a return when the fluid pressure is equal to or greater than the first pressure threshold, a third valve directing the flow from the pump to the return when the fluid pressure is below a second pressure threshold, wherein the third valve directs the flow from the pump to the source coupler when the fluid pressure is above the second pressure threshold.

A second embodiment is directed to a system for providing a flow of a hydraulic fluid having a fluid pressure to a hydraulic tool, the system configured to prevent excessive loss of the hydraulic fluid when the fluid pressure decreases in the system, the system comprising a first valve configured to direct the hydraulic fluid to a return when the fluid pressure is below a first threshold, a second valve configured to direct the hydraulic fluid to a return when the fluid pressure is below a first threshold, and a third valve configured to direct the hydraulic fluid to the first valve when the fluid pressure is above a second threshold, wherein when the fluid pressure is above the second threshold the first valve is configured to direct the hydraulic fluid to a source coupler and the second valve is configured to direct the fluid from a return coupler to the return.

A third embodiment is directed to a system for providing a flow of a hydraulic fluid having a fluid pressure to a hydraulic tool, the system configured to prevent excessive loss of the hydraulic fluid when the fluid pressure decreases in the system, the system comprising a first valve configured to direct the hydraulic fluid from a pump to a source coupler when the fluid pressure is above a first threshold, a second valve configured to direct the hydraulic fluid to a return when the fluid pressure is above a second threshold, wherein the first threshold is greater than the second threshold, and a check valve configured to direct the hydraulic fluid from a return coupler to the return when the fluid pressure is above the first threshold, wherein the check valve is configured to allow fluid to flow therethrough at a third threshold, wherein the third threshold is greater than the second threshold.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF DRAWINGS

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Broadly, embodiments of the invention include a hydraulic system that provides energy to a hydraulic tool such that in the event of a drop in pressure the hydraulic system cuts fluid flow from both the pump side and the return side of the hydraulic system without the use of electrical components. The pressure drop may be a leak in a hose, a malfunction of the tool, or a break or malfunction in couplers attaching the tool to the hydraulic system.

Figure 1A:
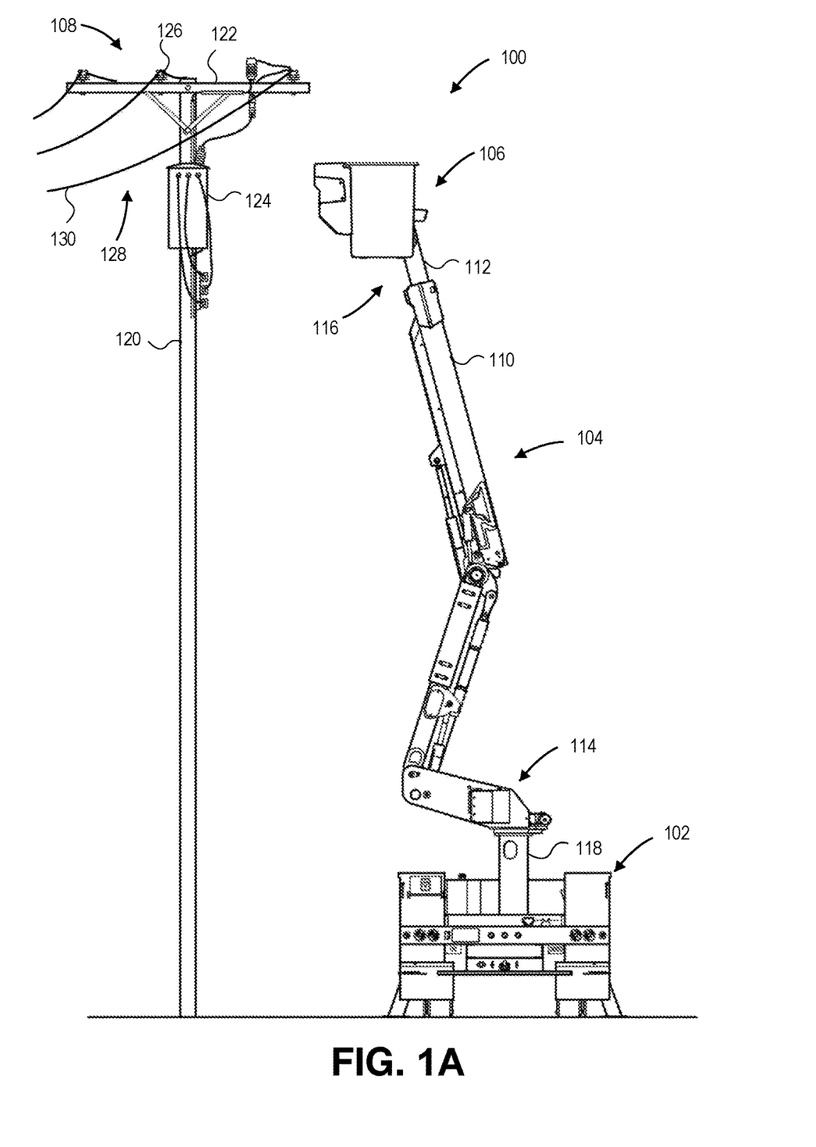
FIG. 1A depicts an exemplary embodiment of an aerial device and a utility pole assembly.

An aerial device 100, constructed in accordance with various embodiments of the invention, is shown in FIG. 1A. The aerial device 100 generally comprises a structural base 102 with a boom assembly 104 rotatably mounted thereto. A utility platform assembly 106 is disposed on the boom assembly 104 to provide the utility platform assembly 106 for the accomplishment of a task by a utility worker. The aerial device 100 may be controlled to allow a user access to an electrified source such as a utility pole assembly 108 while preventing contact between the aerial device 100 and the utility pole assembly 108.

The structural base 102 of the aerial device 100 is a selectively stabilized platform. In embodiments of the invention, the structural base 102 may be a utility truck (as illustrated in FIG. 1), a crane base, an oilrig, an earthworking machine, or a fixed structure. The structural base 102 provides stability and a counterweight to a load being supported by the boom assembly 104. The structural base 102 also provides a hydraulic power system, pneumatic power system, electrical power system, or other system (not illustrated) that powers the movement of the utility platform assembly 106.

The boom assembly 104 broadly comprises an outer boom section 110 and in some embodiments an inner boom section 112. The boom assembly 104 presents a proximal end 114 and a distal end 116. The proximal end 114 is rotatably and/or pivotably secured to a boom turret 118 of the structural base 102. The at least one inner boom section 112 is at least in part disposed within the outer boom section 110. The at least one inner boom section 112 telescopes to extend or retract into the outer boom section 110. All boom operations as well as some structural base operations may be operated by controls disposed in the utility platform assembly 106 or on the structural base 102.

The utility pole assembly 108 as depicted in FIG. 1A may comprise several components. The utility pole assembly 108 may include structural components such as a vertical pole 120 and a cross-member 122. As depicted, electrical components may be mounted on the structural components. A transformer 124 is mounted to the vertical pole 120. Insulators 126 are mounted on the cross-member 122 supporting three phase power lines 128 including power line 130.

Figure 1B:
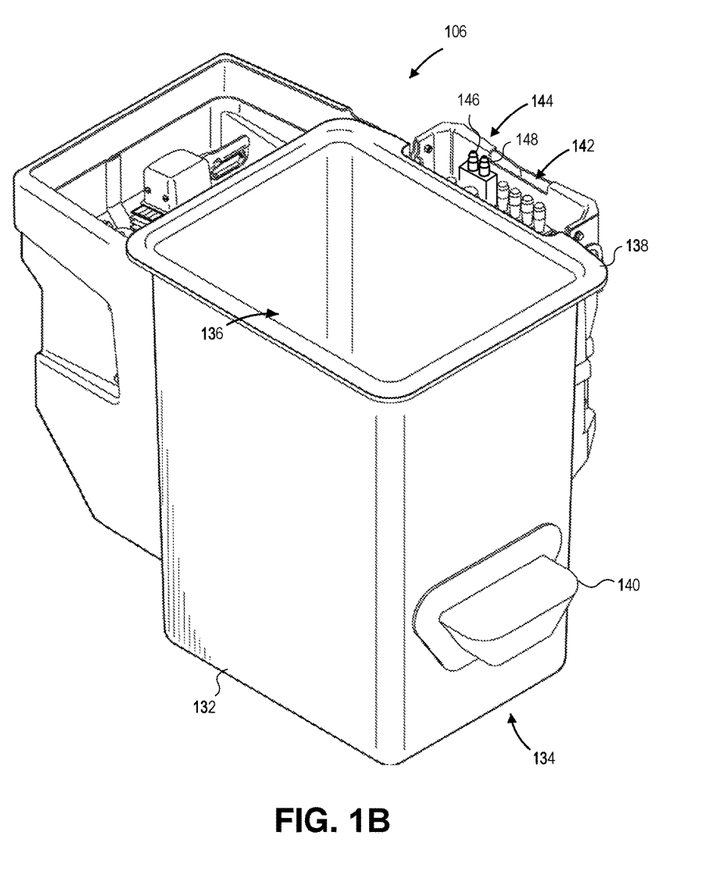
FIG. 1B depicts a perspective view of an embodiment of the utility platform assembly of the aerial device of FIG. 1A including hydraulic fittings.

The utility platform assembly 106, as best illustrated in FIG. 1B, provides an elevated surface from which at least one utility worker can perform a task. Embodiments of the utility platform assembly 106 comprise four bucket sidewalls 132 and a bucket floor 134 that collectively form a cavity 136. The utility platform assembly 106 may also present a bucket lip 138 along a top portion of at least one bucket sidewall 132. The utility platform assembly 106 may further comprise a step 140 and/or a door (not illustrated) in at least one of the bucket sidewalls 132 to allow for ingress and egress of the utility worker. The utility platform assembly 106 may also comprise a handrail (not illustrated).

The four bucket sidewalls 132 and the bucket floor 134 of the utility platform assembly 106 form the cavity 136. The four bucket sidewalls 132 may be unitary, i.e. formed of a single monolithic structure, or they may be coupled together. The transition between successive bucket sidewalls 132, and/or between the bucket sidewalls 132 and the bucket floor 134, may be rounded or arcuate. In some embodiments, the utility platform assembly 106 presents a horizontal cross-section that is substantially rectangular. Thus, two of the opposing bucket sidewalls 132 may have a greater width than the other two opposing bucket sidewalls 132. In other embodiments, the utility platform assembly 106 presents a horizontal cross-section that is substantially square. Other embodiments of the utility platform assembly 106 may be other shapes about the horizontal cross-section, such as an ellipse, a circle, a D-shape, a triangle, a trapezoid, a rhombus, or other quadrilateral. The shape of the cross-section of the bucket may vary along the height of the bucket and the bucket shape may be optimized to perform a given function. The bucket may be designed for one or multiple workers. The workers may be separated by a structure for safety or may be contained within the same cavity 136, as depicted in FIG. 1B.

In embodiments of the invention, the utility platform assembly 106 further comprises a set of upper boom controls 142, as best illustrated in FIG. 1B. The set of upper boom controls 142 are configured to be manipulated by the operator standing in the utility platform assembly 106 so as to move the utility platform assembly 106 and/or the boom assembly 104 to a desired location and configuration. In some embodiments, the set of upper boom controls 142 utilize hydraulic power that is supplied in the form of a hydraulic fluid by a set of hydraulic lines (not illustrated) discussed in more detail below.

The set of upper boom controls 142 allows the operator to move the boom assembly 104 from within the utility platform assembly 106. The operator in the bucket may have a better vantage point to know where and how to position the boom assembly 104 as opposed to the operator on the ground to better avoid contact with the utility pole assembly 108. Additionally, the set of upper boom controls 142 promotes efficiency by allowing the operator to directly control the movement of the boom assembly 104. In embodiments of the invention, an assistant operator (not illustrated) can access a set of lower boom controls (not illustrated) for the duration of the operator being in the utility platform assembly 106. This provides a backup to allow the assistant operator to remove the operator from a situation should the operator become incapacitated or there be a failure in the set of upper boom controls 142. The set of upper boom controls 142 may utilize the same or a different mechanism from the set of lower boom controls.

In some embodiments, the boom assembly 104 and the utility platform assembly 106 comprise a dielectric material coat or other insulative material that electrically insulates the components from high-voltage power sources such as the components of the utility pole assembly 108. The material may coat or cover any of the aerial device 100 components and assemblies. Any of the aerial device 100 components or assemblies may also be made of a dielectric or insulative material including the hydraulic couplers 144.

Hydraulic fittings, or couplers 144, provide an attachment for connecting hydraulic tools to the hydraulic system of the aerial device. The couplers 144 may be in the utility platform assembly 106 as shown in FIG. 1B or may be provided at the structural base 102 or on any component of the aerial device 100 where the hydraulic system may be accessed. A hydraulic tool (not shown) may connect to the hydraulic system using couplers 144. The hydraulic tool may be connected to the hydraulic system and receive hydraulic fluid through a pump coupler 146 and may return the hydraulic fluid to a tank or pump through a return coupler 148. The hydraulic tool attaches hydraulic lines to the couplers 144 and receives hydraulic fluid flowing from the pump coupler 146 allowing the tool to operate when the pressure of the hydraulic fluid reaches an operational threshold of the hydraulic tool then returning the fluid through the return coupler 148. Typically, the minimum threshold pressure for tool operation is 2,000 pounds per square inch (psi), but in some embodiments, the threshold may be below or above this requirement.

Broadly, embodiments of the invention relate to a hydraulic system that automatically shuts off fluid flow to portions of the system based on a loss in pressure. Embodiments of the invention prevent loss of fluid by preventing the fluid from flowing out of the system in the event of a leak or damage. The system may cut off the flow to the couplers 144. In some embodiments, valves block or reroute fluid at both the pump coupler 146 and the return coupler 148. In some embodiments, valves block or reroute fluid before the pump coupler 146 and the return coupler 148. This prevents hydraulic fluid from pumping out of the pump coupler 146 and from leaking out of the return coupler 148 in the event that residual pressure is built up on the return side after the loss in pressure.

A pressure loss may be caused by activities performed by the workers in the utility platform assembly 106. For example, a common use of the aerial device 100 is tree pruning. Trees may grow to interact with power lines. The hydraulic tool may be hydraulic tree trimmers, saws, or any other tool that may be used to trim tree branches. A tree branch may fall on a hydraulic hose, the hydraulic tool, or the couplers 144 and cause damage resulting in a leak of the hydraulic fluid. The leak may cause a quick drop in the pressure of the hydraulic system causing valves in the system to change state blocking the flow of hydraulic fluid from the pump coupler 146 and the return coupler 148.

To avoid any electrical discharge while working in close proximity to high-voltage power sources the hydraulic system including the cutoff valves have no electrical components. The hydraulic system may be open center or closed center and in embodiments comprises check valves and directional control valves but may comprise any valves such as for example pressure control, flow control, rotary, direct acting, pilot, or any other type valve that can perform the necessary functions described herein.

In general, embodiments of the hydraulic system include valves, meters, springs, couplers, fluid lines, pipes, pumps, motors, fluids, and any other components and items necessary for the operation of the below-described embodiments of the invention. The hydraulic system may be powered by energy generated at the aerial device 100 or may be connected to an auxiliary power source. The hydraulic system may have multiple access points allowing hydraulic tools to be operated at any component of the aerial device 100 or on the ground in proximity to the aerial device 100. The hydraulic system may be configured such that multiple tools may be connected and operated simultaneously. The aerial device 100 may include multiple independent hydraulic systems or multiple hydraulic systems that may be selectively connected, for example, through valves and/or couplers.

Figure 2:
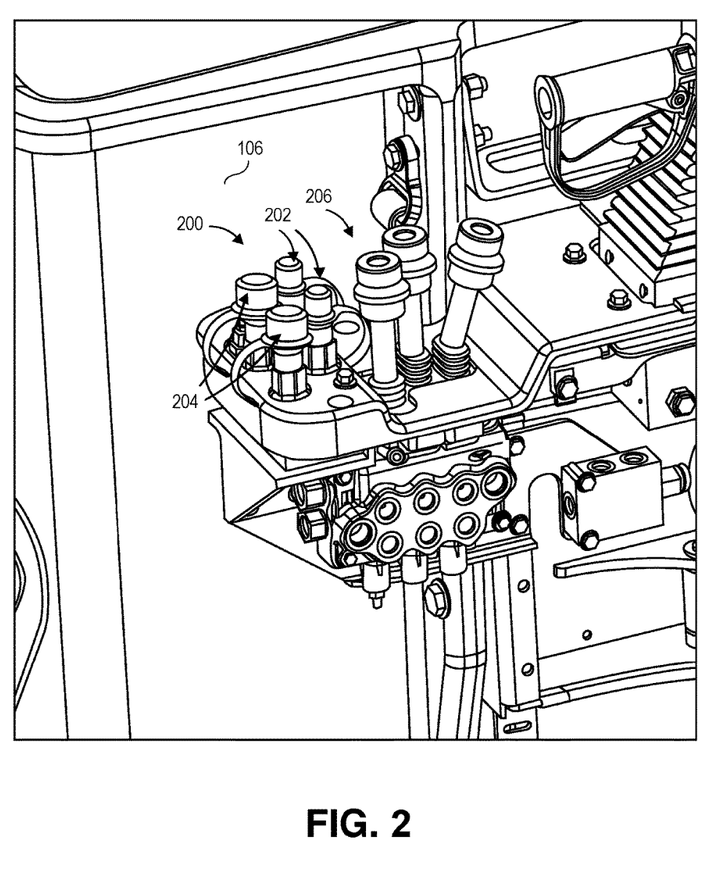
FIG. 2 depicts an exemplary embodiment of hydraulic fittings mounted on the utility platform of FIG. 1B.

FIG. 2 depicts an exemplary embodiment of hydraulic couplers 200 for mounting a hydraulic tool (not shown). In some embodiments, hydraulic couplers 200 may be couplers 144 depicted in FIG. 1B. The hydraulic couplers 200 may be mounted in the utility platform assembly 106 as depicted. The hydraulic couplers 200 may comprise supply couplers 202 for receiving hydraulic fluid from a pump (not shown) and return couplers 204 for sending the hydraulic fluid back to the pump, in the case of a closed loop system, or a tank (not shown), in the case of an open loop system. The hydraulic fluid, and pump, may be controlled using controls 206. The controls 206 may control the flow of the hydraulic fluid for creating pressure in the system. The hydraulic fluid pressure in the system may enable operation of the hydraulic tool. The exposed hydraulic couplers 200 and any exposed lines attached to the hydraulic couplers 200 and the hydraulic tool may become damaged or leak causing the loss in pressure to the hydraulic system. Upon a drop in pressure in the system valves within the system may prevent fluid from exiting the supply couplers 202 and the return couples 204 thus preventing excessive loss of hydraulic fluid. The system of valves describing embodiments of the invention will now be discussed.

Figure 3:
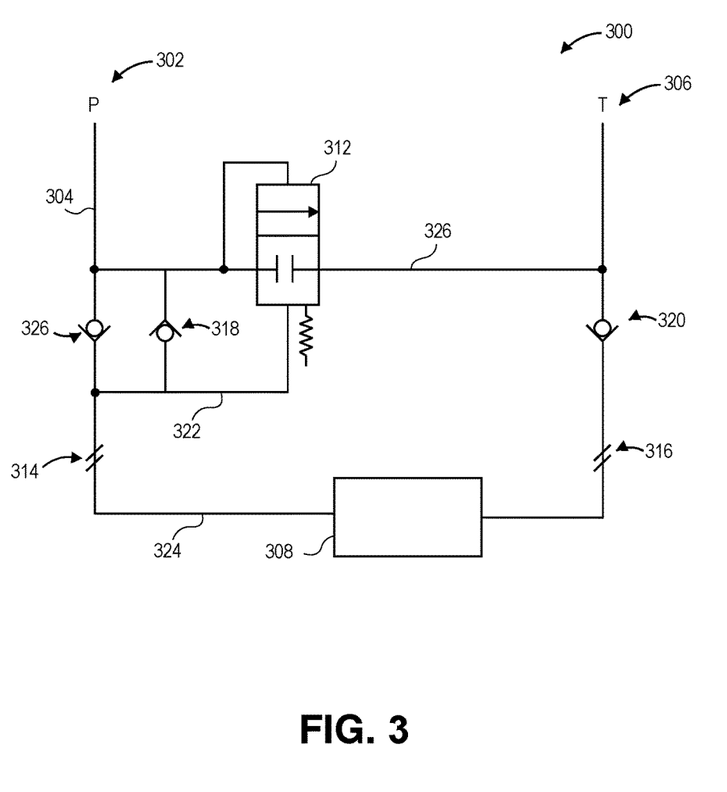
FIG. 3 depicts a first exemplary hydraulic system consistent with some embodiments of the invention.

FIG. 3 depicts an embodiment of an open center hydraulic system 300. The open center hydraulic system 300 comprises a pressure source (P) 302 pressurizing a hydraulic fluid within hydraulic lines 304, a tank (T) 306, a selectively attached hydraulic tool 308 including a hydraulic motor (not shown), three check valves, and one two-position two-way normally closed spring operated directional control valve, or referred to in this embodiment two-way valve 312. The hydraulic tool 308 may be attached to the hydraulic system using the lead (pump or supply) coupler 314 and the return coupler 316. In some embodiments, the hydraulic fluid may be water based or oil based. The pressure source, or pump 302 supplying the pressure, may be any fluid pump capable of supplying the pressure needed as described in embodiments of the invention. The hydraulic tool 308 may be any mechanical tool or equipment using hydraulic energy as the power source. The hydraulic tool 308 may be hand operated, automatically controlled, hand-held, or mounted on any portion of the aerial device 100. The hydraulic tool 308 may be operational at the utility platform assembly 106, on the ground, or on any portion of the aerial device 100. The hydraulic tool 308 may be configured to attach to the hydraulic system of the aerial device 100 at any access point on the aerial device 100 giving the system flexibility as to the location of operation of the hydraulic tool 308. The open center hydraulic system 300 may be configured to operate at any location of the hydraulic system of the aerial device 100 where the hydraulic tool 308 may be attached.

In certain embodiments, the pump 302 may be located in the aerial device 100 or may be separate such that it may be attached to the aerial device 100 hydraulic system and provide the pressure needed for operating the hydraulic tool 308 separate the aerial device 100. The pump 302 may be located at the structural base 102, the utility platform assembly 106, or at any location that may be useful to provide the hydraulic energy required to operate the hydraulic tool 308. The pump 302 may include a motor for operating the pump 302 or may be powered by the motor or electrical system of the aerial device 100. The pump 302 motor may be electric or powered by gas or diesel fuel and may be located in any component of the aerial device 100.

The hydraulic fluid may flow from the pump 302 through the lines 304 of the open center hydraulic system 300. When a fluid pressure in the system is below a minimal threshold, the fluid flows from the pump 302 through the two-way valve 312 to the return 306, which, in an open center system, is the tank. When the hydraulic fluid is of sufficient pressure to activate the two-way valve 312 (i.e. above the first threshold or setting), the two-way valve 312 switches, in some embodiments closing, directing the fluid flow to the hydraulic tool 308. For example, the two-way valve 312, as depicted in FIG. 3, only allows fluid to flow to the return 306 below a pressure threshold. Once a pressure threshold is met the fluid is directed to flow through the check valve 318. Check valve 318 and check valve 320 may open at a combined pressure equivalent to the pressure required for the two-way valve 312 to switch. The pressure threshold for the two-way valve 312 to operate is, for example, 150 psi. Once the pressure of the fluid acting on the two-way valve 312 is at or above the exemplary 150 psi the two-way valve 312 switches and directs the hydraulic fluid to flow along line 322 to line 324 and to the hydraulic tool 308. The pressure is achieved by providing a resistance in the open center hydraulic system of the exemplary 150 psi. This is done by combining required pressure for opening the check valve 318 and the check valve 320. The check valve 318 may have an operational pressure threshold or setting of, for example, 100 psi and the check valve 320 may have an operational pressure threshold or setting of, for example, 50 psi. The exemplary pressures combined, or summed, are equivalent to the minimum pressure threshold of 150 psi required to move the two-way valve 312. In the closed position (at a pressure lower than the exemplary 150 psi) the check valve 318 and check valve 320 remain closed preventing fluid from flowing to the hydraulic tool 308 while the two-way valve 312 directs the hydraulic fluid from the pump 302 to the return 306.

Continuing with the exemplary embodiment in FIG. 3, when the fluid pressure is above the exemplary pressure of the 150 psi threshold the hydraulic fluid is provided to the hydraulic tool 308. The fluid pressure may then increase to a required pressure threshold or setting for operation of the hydraulic tool 308. At this point the hydraulic tool 308 is operational.

In the event of a leak or malfunction, the open center hydraulic system 300 cuts off the flow to the hydraulic tool 308. The pump coupler 314 and the return coupler 316 which, in some embodiments, may be pump coupler 146 and return coupler 148, connect to the hydraulic lines 324 of the hydraulic tool 308 to allow the hydraulic fluid to flow from the pump coupler 314 to the hydraulic tool 308 and return via the return coupler 316. In the event that damage occurs to the couplers, to the hydraulic tool lines 324, or to the hydraulic tool 308, and pressure may drop below 150 psi and check valve 318 and check valve 320 close and two-way valve 312 switches to direct fluid flow from the pump 302 to the return 306 via hydraulic line 326. This prevents the hydraulic fluid from exiting the open center hydraulic system 300 via the pump coupler 314 and the return coupler 316 or from any point on the hydraulic tool lines 324 or from the hydraulic tool 308. Realistically there may be a slight delay to allow for the pressure to drop and the check valves to close, but the delay should be minimal and the majority of the hydraulic fluid should remain in the system. With the open center hydraulic system 300 preventing fluid flow beyond the check valve 318 and the check valve 320, any damage to the hydraulic tool lines 324 and hydraulic tool 308 may be fixed or replaced.

In some embodiments, a check valve 326 may be placed at the end of the pump coupler 314 on the pump 302 side such that the hydraulic tool 308 may be attached. Without the check valve 326 the incompressible hydraulic fluid would prevent attachment. Similarly, the check valve 320 may also provide this function to the return coupler 316 such that the hydraulic tool 308 may be attached.

In some embodiments utilizing the hydraulic system depicted in FIG. 3, the setting of check valve 318 may be slightly higher than check valve 320 and may be slightly higher than the minimum circulation pressure of the hydraulic fluid flowing from the pump 302 to the return 306. The shift pressure or minimum operational threshold of check valve 320 may be as high as possible while still allowing connection of the hydraulic tool 308 at the return coupler 316 and the shift pressure of the direction control valve 312 may be greater than the required pressure to open check valve 318. This configuration allows operation as described above.

The minimum pressures required for opening and switching the valves may change if connect-under-pressure couplers are used. When connect-under-pressure couplers are used, the minimum pressure requirements may be increased based on the lowest allowable pressure to remain operative at the lowest pressure allowable by the hydraulic tool. However, the pressure relationships between valves may remain the same such that the valves shift in the same sequence as described above.

In general, in some embodiments, the couplers are quick disconnect Parker FF-371 and FF-372 couplers. Settings of the check valves 326 and 320 could be different values than described above without loss of effectiveness of the circuit. Settings of the check valves 326 and 320 could be changed with connect under pressure couplers. For example, the setting of check valve 326 may be just low enough to allow for connection of the coupler 314 and in some embodiments less than 50 psi. The setting of the check valve 318 may be greater than check valve 320 and just greater than the circulation pressure. The setting of the check valve 320 may be as high as possible while still allowing connection of the coupler 316. The shift pressure of the direction control valve 312 may be just higher than the pressure required to shift, or open, check valve 318.

Figure 4:
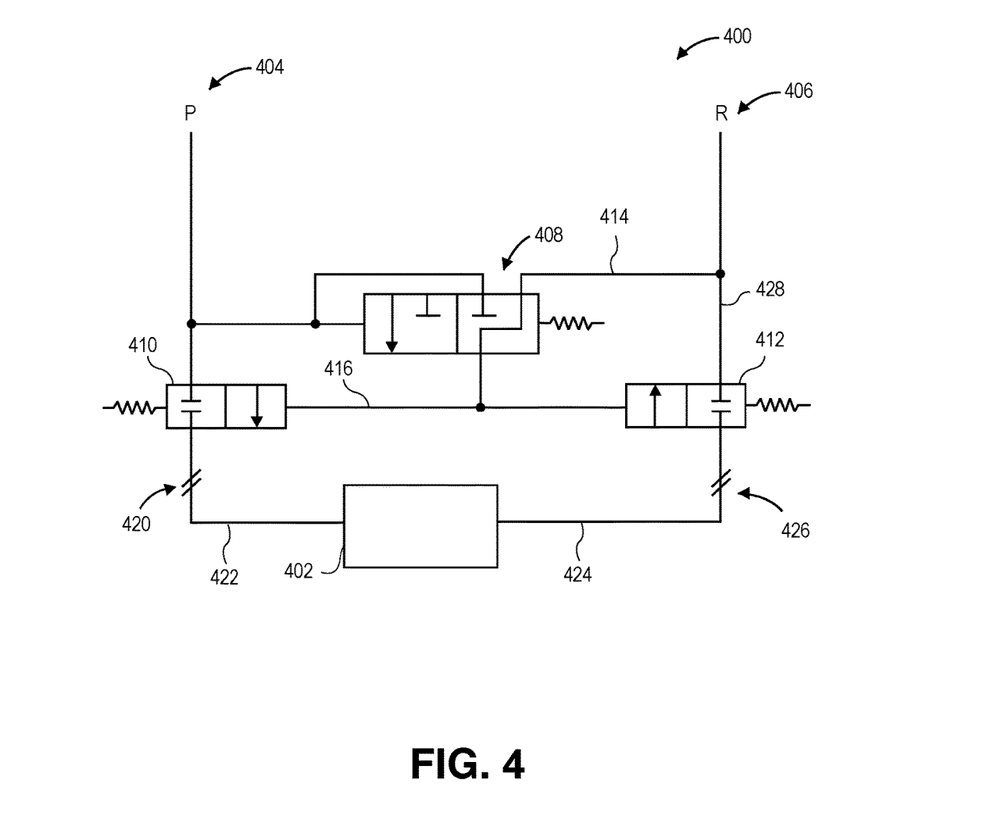
FIG. 4 depicts a second exemplary hydraulic system consistent with some embodiments of the invention.

FIG. 4 depicts a closed center hydraulic system 400 for providing hydraulic energy to the hydraulic tool 402 consistent with some embodiments of the invention. The closed center hydraulic system 400 provides fluid from the pump 404 and returns the operational fluid to the system via the return 406 to the tank. The closed center hydraulic system 400 includes at least three spring operated directional control valves. Of the three directional control valves one is a two-position three-way valve (three-way valve 408) and two are two-position two-way valves (pump two-way valve 410 and return two-way valve 412).

The three-way valve 408 is normally open and switches between positions at a pressure threshold, in this exemplary embodiment 1,800 psi, to provide fluid to the two two-way valves. When an exemplary pressure of 1,800 psi is provided to the three-way valve 408 the valve changes state, or switches position, directing the fluid to line 416 and to two-way valve 410 and two-way valve 412. In the exemplary embodiment presented herein two-way valve 410 and two-way valve 412 are normally closed and configured to open at 1,800 psi. Upon opening, the hydraulic energy is supplied to the hydraulic tool 402, including the hydraulic motor (not shown), though the pump coupler 420 then via the hydraulic tool lines 422. After providing operational energy to the hydraulic tool 402, the fluid continues along the hydraulic tool line 424 through the return coupler 426 and two-way valve 412 along line 428 and to the return 406.

Though in embodiments, the threshold pressure for the three valves is 1,800 psi this is exemplary based on a 2,000 psi threshold for the hydraulic tool 402 operation. The pressure threshold for any valve and any hydraulic tool operation may be anything that allows operation of the hydraulic tool 402. For example, the three-way valve 408 may have a different threshold such that the three-way valve 408 opens at a lower pressure than the pump two-way valve 410 and the return two-way valve 412. The three-way valve 408 may open at an exemplary pressure of 1,500 psi and the pump two-way valve 410 and the return two-way valve 412 may open at an exemplary pressure of 1,900 psi. This would ensure that three-way valve 408 is fully shifted before pump two-way valve 410 and tank two-way valve 412 open.

Continuing with the embodiment depicted in FIG. 4, in the event that the pressure drops below the threshold values of the two-way valves the pump two-way valve 410 and the return two-way valve 412 close and the fluid stops flowing to the pump coupler 420 and the return coupler 426. This prevents the fluid from flowing out of the system through a leak in the line 424, the hydraulic tool 402, the pump coupler 420, or the return coupler 426. In the event that the pressure drops below the threshold of operation of the three-way valve 408 the three-way valve 408 reverts to the original, normal state, stopping fluid from the pump 404 at the three-way valve 408. This prevents large amounts of fluid loss and possible damage to the hydraulic tool 402 and other equipment. This also prevents other problems such as contamination from the hydraulic fluid or fire as described above.

Figure 5:
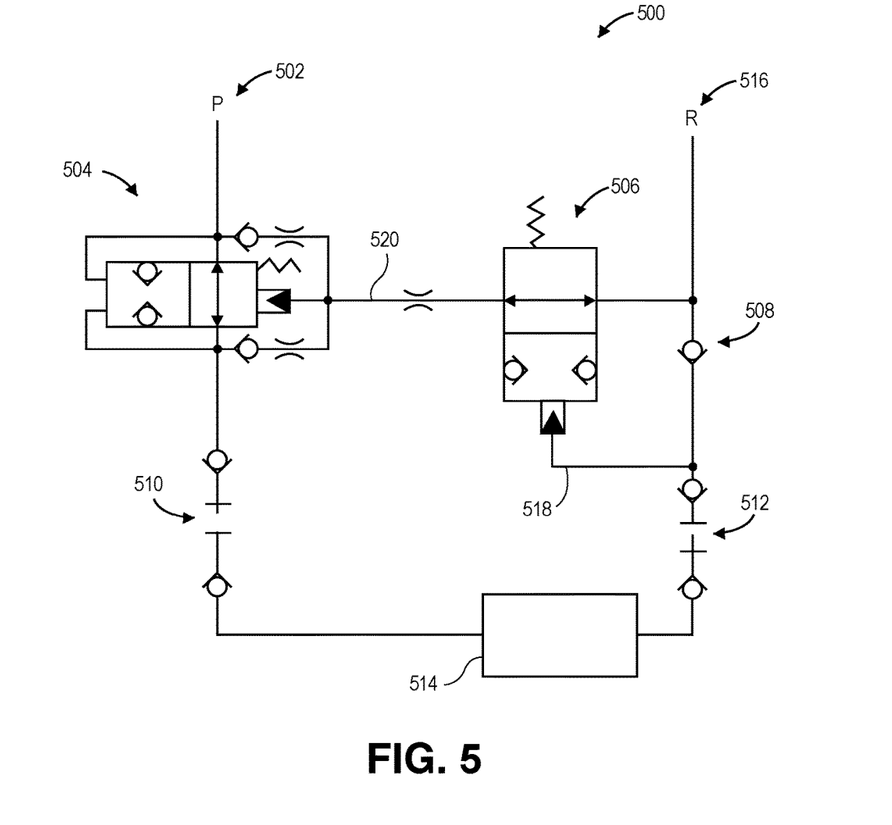
FIG. 5 depicts a third exemplary hydraulic system consistent with some embodiments of the invention.

FIG. 5 depicts a closed center hydraulic system consistent with some embodiments of the invention. The closed center hydraulic system 500 includes a pump 502, a first directional control valve 504, a second directional control valve 506, a check valve 508, a supply coupler 510 and a return coupler 512, for providing hydraulic fluid to a hydraulic tool 514. In some embodiments, the pressure to open the check valve 508 is approximately 50 psi. This pressure may be any pressure low enough to allow the hydraulic tool 514 to be attached at return coupler 512. The pressure required to shift the second directional control valve 506 may be less than the pressure required to open check valve 508. In some embodiments, the pressure required to shift the first direction control valve 504 may be 160 psi. This pressure requirement may be different while the other pressure thresholds required to change the valves are changed to maintain the pressure relationships between valves and to maintain operation of the hydraulic tool.

Continuing with the embodiment depicted in FIG. 5, when the hydraulic pressure is below a first threshold the hydraulic fluid flows from the pump 502 to the return 516. When the pressure exceeds the first threshold the second directional control valve 506 opens allowing hydraulic fluid to flow along line 520, however since no fluid is flowing through the hydraulic tool 514 the hydraulic fluid continues to flow from the pump 502 to the return 516 along line 520. When the hydraulic pressure reaches a second threshold the first directional control valve 504 opens and the hydraulic fluid flows through the first directional control valve 504 through the hydraulic tool 514 and to the return 516 via the check valve 508. Additionally, line 518 becomes pressurized closing directional control valve 506 stopping fluid flow from line 520 to return 516. In the event of a loss of pressure in the system, the first direction control valve 504 switches, the check valve 508 closes, the second direction control valve 506 switches, and the hydraulic fluid flows from the pump 502 through the first direction control valve 504 then through the second direction control valve 506 and back to the return 516.

The minimum pressures required for opening and switching the valves may change if connect-under-pressure couplers are used. When connect-under-pressure couplers are used, the minimum pressure requirements may be increased based on the lowest allowable pressure to remain operative at the lowest pressure allowable by the hydraulic tool. However, the pressure relationships between valves may remain the same such that the valves shift in the same sequence as described above.

Figure 6:
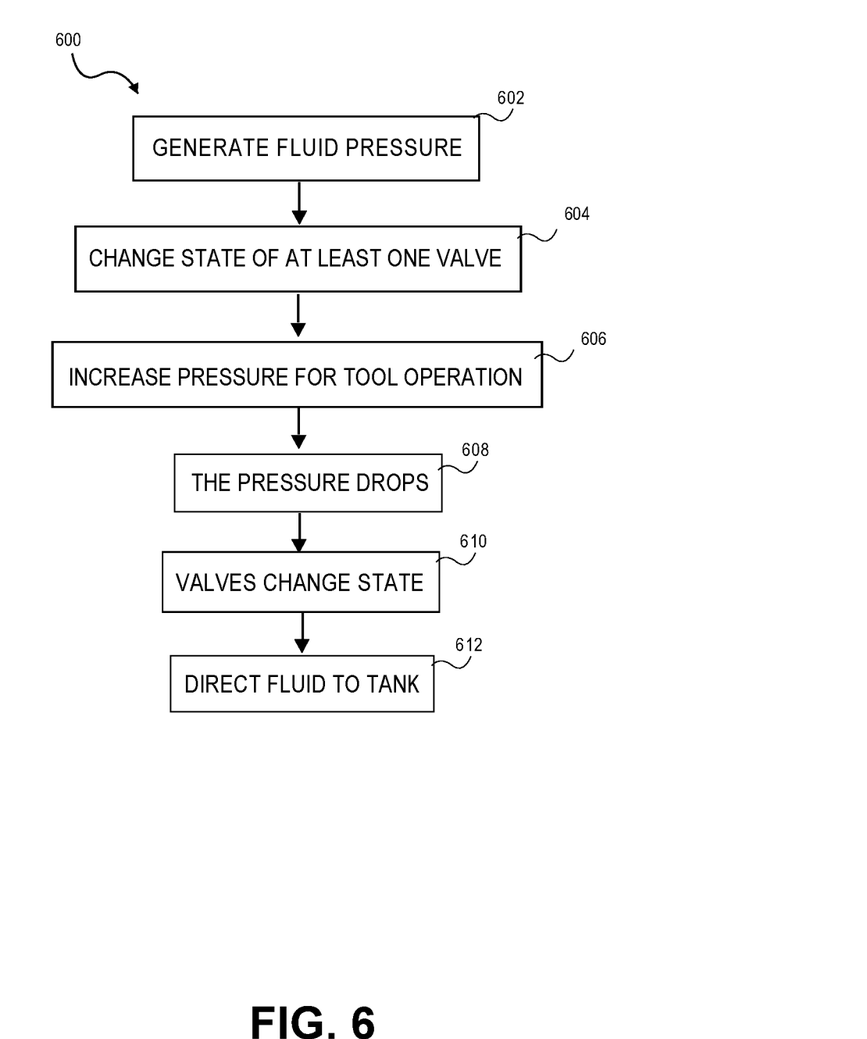
FIG. 6 depicts a first flow chart representing a method consistent with certain embodiments of the invention.

Turning now to FIG. 6 depicting an exemplary method 600 consistent with embodiments of the invention, at step 602 pressure is supplied from the pump to the system. The pump is made operable by a power source either at the pump or connected from an aerial device or independent power source. The pump acts on the hydraulic fluid to provide pressure to the system. The system is an open center system returning the fluid from the valve system to the tank before returning to the pump.

At step 604, the pressure in the system reaches a first minimum pressure threshold required to operate at least one valve. In the embodiment of the open center system provided above, three operational valves are used as reference valves. As the pressure is increased in the system the total resistance in the system is equivalent to the pressure. When the first minimum pressure threshold is reached the at least one valve changes state, or shifts, directing fluid flow toward the tool. In the open center embodiment discussed in FIG. 3 the valves consist of one directional control valve and at least two check valves. However, the valves may be any combination that achieves the intended function of the hydraulic circuit.

At step 606, the fluid flows from the pump through the valves through the hydraulic tool and to the return. The hydraulic tool is connected to a pump coupler and a return coupler that are positioned on the tool-side of the hydraulic system such that when the valves are closed the fluid does not exit the closed system. The pressure in the system is increased until the pressure reaches a second minimum threshold. The second minimum threshold is the pressure required for operation of the hydraulic tool.

At step 608, a malfunction causes the pressure drop in the system. The pressure in the system may drop as a result of damage or a leak in a hose on the hydraulic tool side of the couplers, at a coupler, or at the hydraulic tool. The damage may be the result of faulty equipment, a tree branch falling on the equipment, or misuse by the utility workers.

At step 610, the valves close and stop the flow of fluid from the pump side and prevent the flow of fluid from the return side. When the pressure drops below the first minimum threshold, the valves may close. The valves, positioned before the couplers may close preventing fluid from flowing out of the system through the leak that is located on the hydraulic tool side of the couplers. Stopping the flow at this point prevents loss of fluid and potential hazards such as slipping, contamination, and fire.

At step 612, the fluid may be directed from the pump to the tank. A valve, in embodiments described above, a directional control valve, directs the fluid from the pump to the return and, in an open center system, to the tank.

Figure 7:
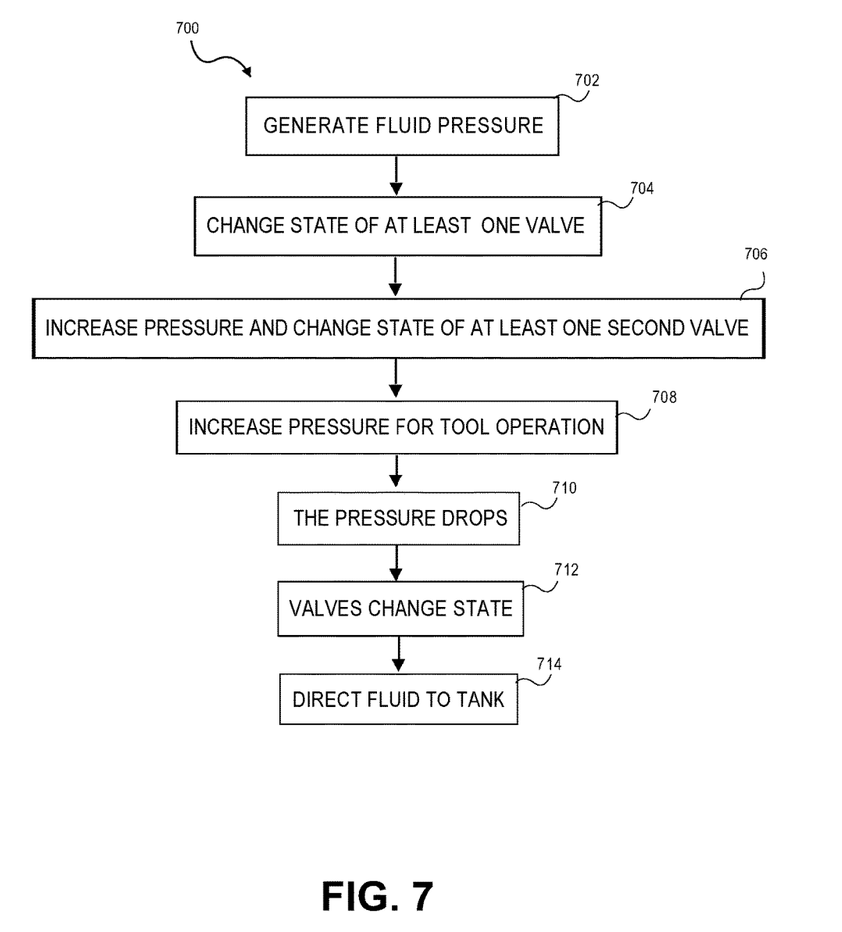
FIG. 7 depicts a second flow chart representing a method consistent with certain embodiments of the invention.

Turning now to FIG. 7 depicting an exemplary method 700 consistent with embodiments of the invention, at step 702 pressure is supplied from the pump to the system. The pump is made operable by a power source either at the pump or connected from an aerial device or independent power source. The pump acts on the hydraulic fluid to provide pressure to the system. The system is a closed center system returning the fluid from the valve system to the pump, bypassing the tank.

At step 704, the pressure in the system reaches a first minimum pressure threshold required to operate a first valve. In some embodiments, the first valve is a two-position three-way valve. When the valve is operated, the valve directs the fluid to at least a second valve. In some embodiments, the fluid may also be directed to a third valve.

At step 706, the pressure increases to a second minimum threshold required to operate the second valve and the third valve. In some embodiments, the second valve is a two-position two-way valve and A third valve may also be present and is a two-position two-way valve. In some embodiments, the pressure threshold for activating the second valve and the pressure threshold for activating the third valve are different and a third pressure threshold is needed. When the second valve and the third valve are activated, the fluid pressure is applied to the hydraulic tool.

At step 708, the pressure is increased to a third threshold that is the required pressure for operation of the hydraulic tool. In some embodiments, when the pressure threshold for the second valve and the pressure threshold for the third valve are different, a fourth pressure threshold may be needed for hydraulic tool operation. In some embodiments, the pressure threshold for hydraulic tool operation may be equivalent to the second pressure threshold or the third pressure threshold.

At step 710, the fluid pressure in the system drops. The pressure reduction may be due to a system malfunction, tool malfunction, or a leak. In some embodiments, when the pressure drops below the third threshold the second valve and the third valve close locking off the tool from the fluid flow. When the fluid pressure drops below the first threshold the first valve switches further blocking the fluid flow from the system by directing the flow to the return. This may isolate the leak and reduce the amount of fluid loss and damage to the system or other tools and equipment. In some embodiments, the first threshold may be equivalent to the second threshold such that the fluid flow is directed to the return through the first valve simultaneously when the second and third valve are closed.

At step 712, the valves close and stop the flow of fluid from the pump side and prevent the flow of fluid from the return side. In some embodiments, when the pressure drops below the second minimum threshold, the valves close. The valves, positioned before the couplers close preventing fluid from flowing out of the system through the leak that is located on the hydraulic tool side of the couplers. Stopping the flow at this point prevents loss of fluid and potential hazards such as slipping, contamination, and fire.

At step 714, the fluid is directed from the pump to the tank. A valve, in embodiments described above, a directional control valve, upon the pressure dropping to the first threshold, directs the fluid from the pump to the return and, in an open center system, to the tank. In a closed center system, the fluid is directed back to the pump. In some embodiments, the first pressure threshold may be the same as the second pressure threshold.

The hydraulic components and methods of use provided herein may be used individually or in any combination. The components and methods may also be used with other components and methods. These methods may provide a hydraulic system, or circuit, that prevents the flow of fluid from within the system to the exterior through a leak by closing valves. This operation may prevent loss of hydraulic fluid and prevent accidents such as slipping, contamination, or fire.

It should be appreciated that, while the above disclosure has been generally directed to the field of aerial devices, embodiments of the invention may be directed to other fields and uses. For example, embodiments of the invention may be used in stationary cranes, antennas, digger derricks, wood chippers, and other equipment that may utilize hydraulic systems and hydraulic tools and come into contact or used in close proximity to high-voltage electrically charged components.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for providing a flow of a hydraulic fluid having a fluid pressure to a hydraulic tool, the system configured to prevent excessive loss of the hydraulic fluid when the fluid pressure decreases in the system, the system comprising:
   a first valve directing the flow through a source coupler to the hydraulic tool when the fluid pressure is above a first pressure threshold;
   a second valve receiving the flow from a return coupler and directing the flow to a return when the fluid pressure is equal to or greater than the first pressure threshold; and
   a third valve directing the flow from a pump to the return when the fluid pressure is below a second pressure threshold;
   wherein the third valve directs the flow from the pump to the first valve when the fluid pressure is above the second pressure threshold, wherein the third valve is disposed between the first valve and the second valve.

2. The system of claim 1, wherein the system is an open center hydraulic system and the return flows to a tank.

3. The system of claim 2, wherein the first valve and the second valve are check valves and the third valve is a two-position two-way normally closed directional control.

4. The system of claim 3, wherein the second pressure threshold is greater than the first pressure threshold.

5. The system of claim 4, wherein the second valve is open at a third pressure threshold that is less than the first pressure threshold.

6. The system of claim 1, wherein the system is a closed center hydraulic system and the return flows to a tank.

7. The system of claim 6, wherein the first valve and the second valve are two-position two-way directional control valves and the third valve is a two-position three-way directional control valve.

8. The system of claim 7, wherein the third valve is configured to direct the hydraulic fluid to flow from a pump to the first valve when the fluid pressure is greater than the second pressure threshold.

9. The system of claim 8, wherein the third valve is configured to direct the hydraulic fluid from the first valve and the second valve to the return when the fluid pressure drops below the second threshold.

10. A system for providing a flow of a hydraulic fluid having a fluid pressure to a hydraulic tool, the system configured to prevent excessive loss of the hydraulic fluid when the fluid pressure decreases in the system, the system comprising:
a first valve configured to direct the hydraulic fluid to a return when the fluid pressure is below a first threshold;
a second valve configured to direct the hydraulic fluid to a return when the fluid pressure is below a first threshold; and
a third valve configured to direct the hydraulic fluid to the first valve when the fluid pressure is above a second threshold,
wherein when the fluid pressure is above the second threshold the first valve is configured to direct the hydraulic fluid to a source coupler and the second valve is configured to direct the fluid from a return coupler to the return,
wherein the first valve is disposed between the second valve and the third valve.

11. The system of claim 10,
wherein the first valve and the second valve are closed when the pressure is below the first threshold, and
wherein the system is a closed center hydraulic system and the return comprises a tank.

12. The system of claim 10, wherein the second threshold is at least 1,800 pounds per square inch.

13. The system of claim 10, wherein the third valve is a two-position three-way valve.

14. The system of claim 10, wherein the first valve is a two-position two-way directional control valve.

15. The system of claim 10, wherein upon the fluid pressure dropping below the first threshold the first valve stops the hydraulic fluid from flowing to the hydraulic tool and the third valve directs the hydraulic fluid from the first valve and the second valve.

16. A system for providing a flow of a hydraulic fluid having a fluid pressure to a hydraulic tool, the system configured to prevent excessive loss of the hydraulic fluid when the fluid pressure decreases in the system, the system comprising:
a first valve configured to direct the hydraulic fluid from a pump to a source coupler when the fluid pressure is above a first threshold;
a second valve configured to direct the hydraulic fluid to a return when the fluid pressure is above a second threshold,
wherein the first threshold is greater than the second threshold; and
a check valve configured to direct the hydraulic fluid from a return coupler to the return when the fluid pressure is above the first threshold,
wherein the check valve is configured to allow fluid to flow therethrough at a third threshold,
wherein the third threshold is greater than the second threshold,
wherein the hydraulic fluid travels from the pump to the return by way of only the second valve or the source coupler and the return coupler.

17. The system of claim 16, wherein the system is a closed center hydraulic system and the return comprises a tank.

18. The system of claim 16, wherein the third threshold is equal to or less than 50 pounds per square inch.

19. The system of claim 16,
wherein when the fluid pressure drops below the first threshold the first valve prevents the hydraulic fluid from flowing to the source coupler, and
wherein when the fluid pressure drops below the second threshold the second valve directs the fluid flow from the pump to the return.

20. The system of claim 16, wherein the first threshold is equal to or less than 160 pounds per square inch.

* * * * *